Aug. 9, 1938.   E. T. TURNER   2,126,589
AUTOMOBILE
Filed May 13, 1936   3 Sheets-Sheet 3
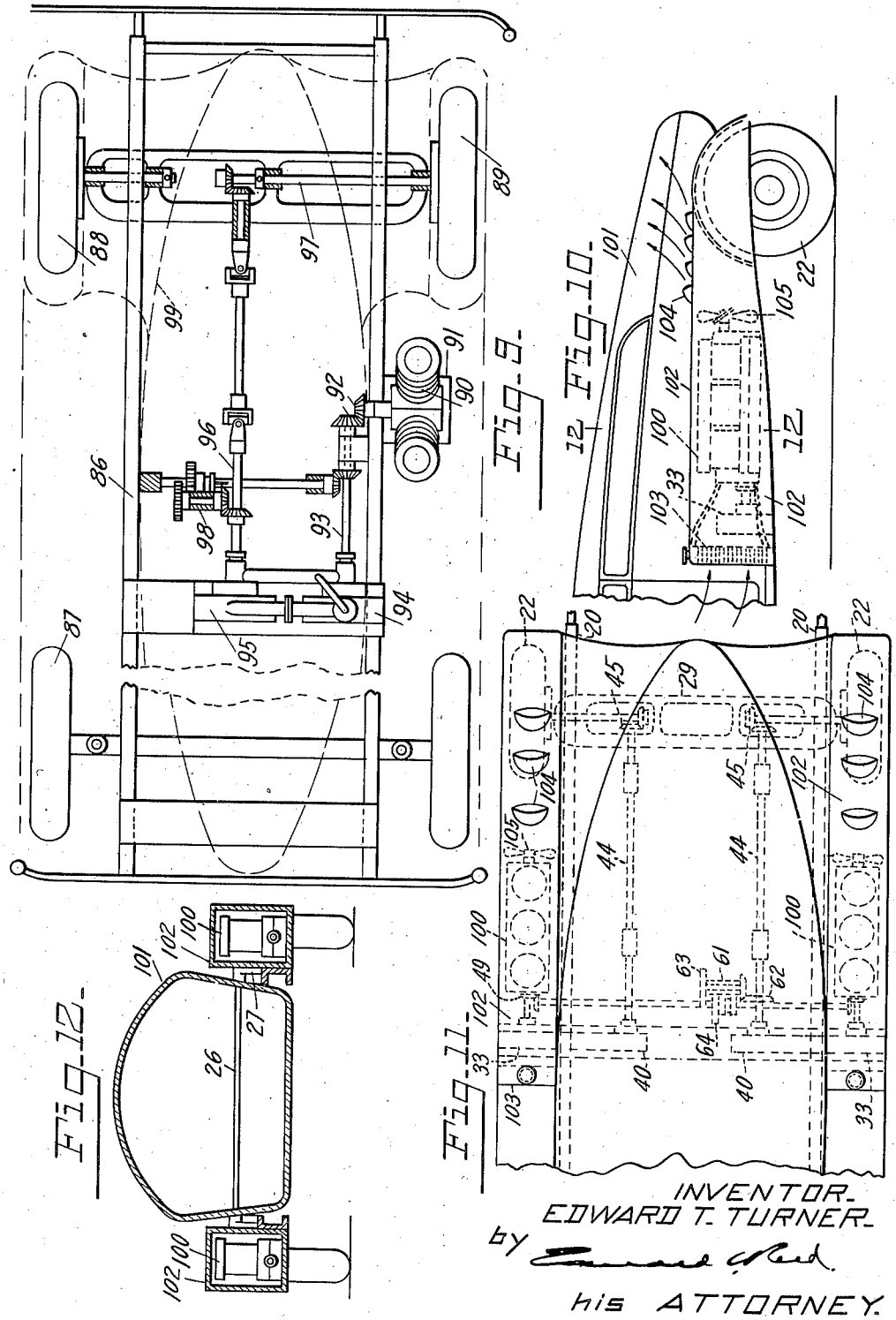
INVENTOR.
EDWARD T. TURNER.
by
his ATTORNEY.

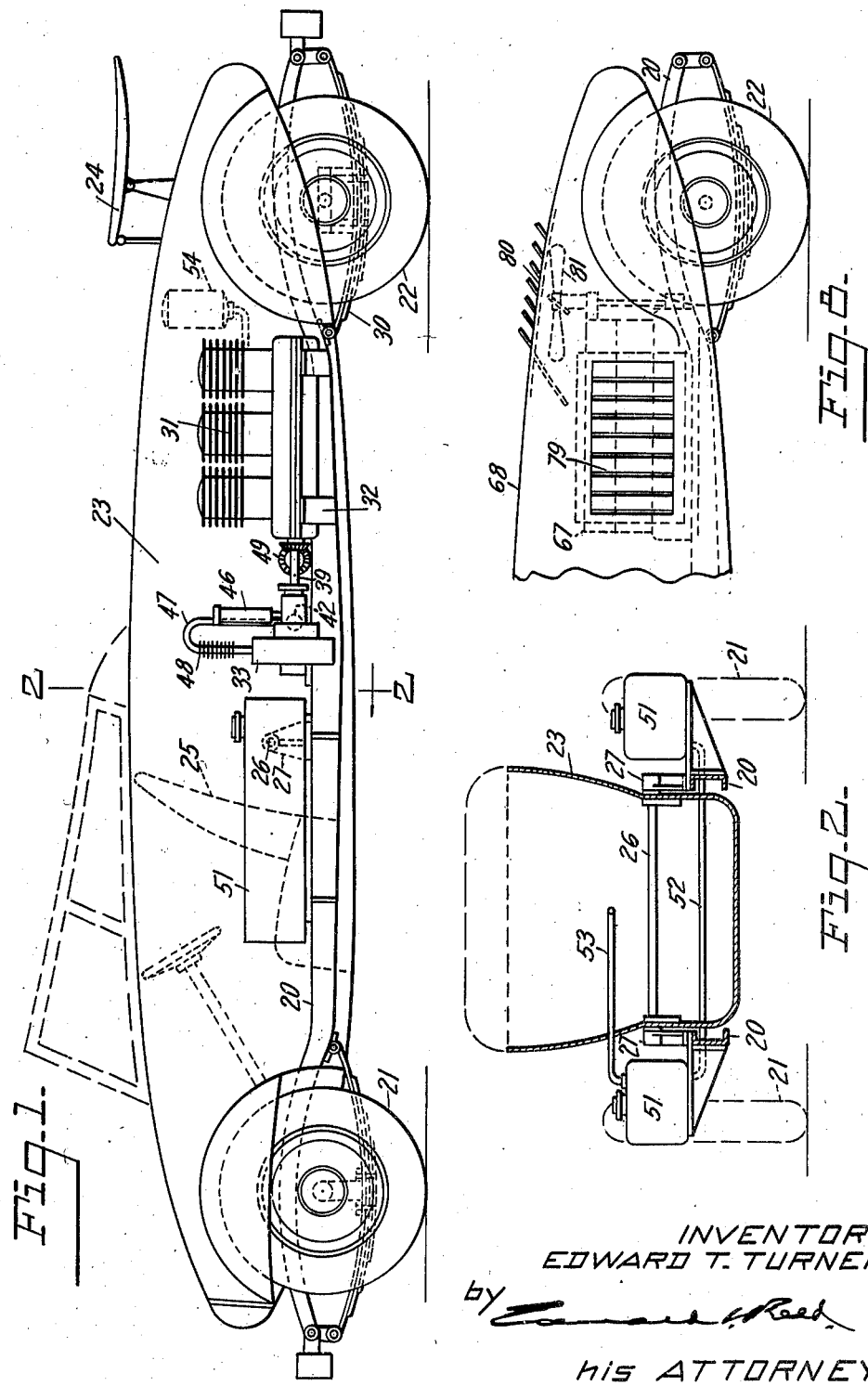
Aug. 9, 1938.     E. T. TURNER     2,126,589
AUTOMOBILE
Filed May 13, 1936     3 Sheets-Sheet 1
INVENTOR.
EDWARD T. TURNER.
by
his ATTORNEY.

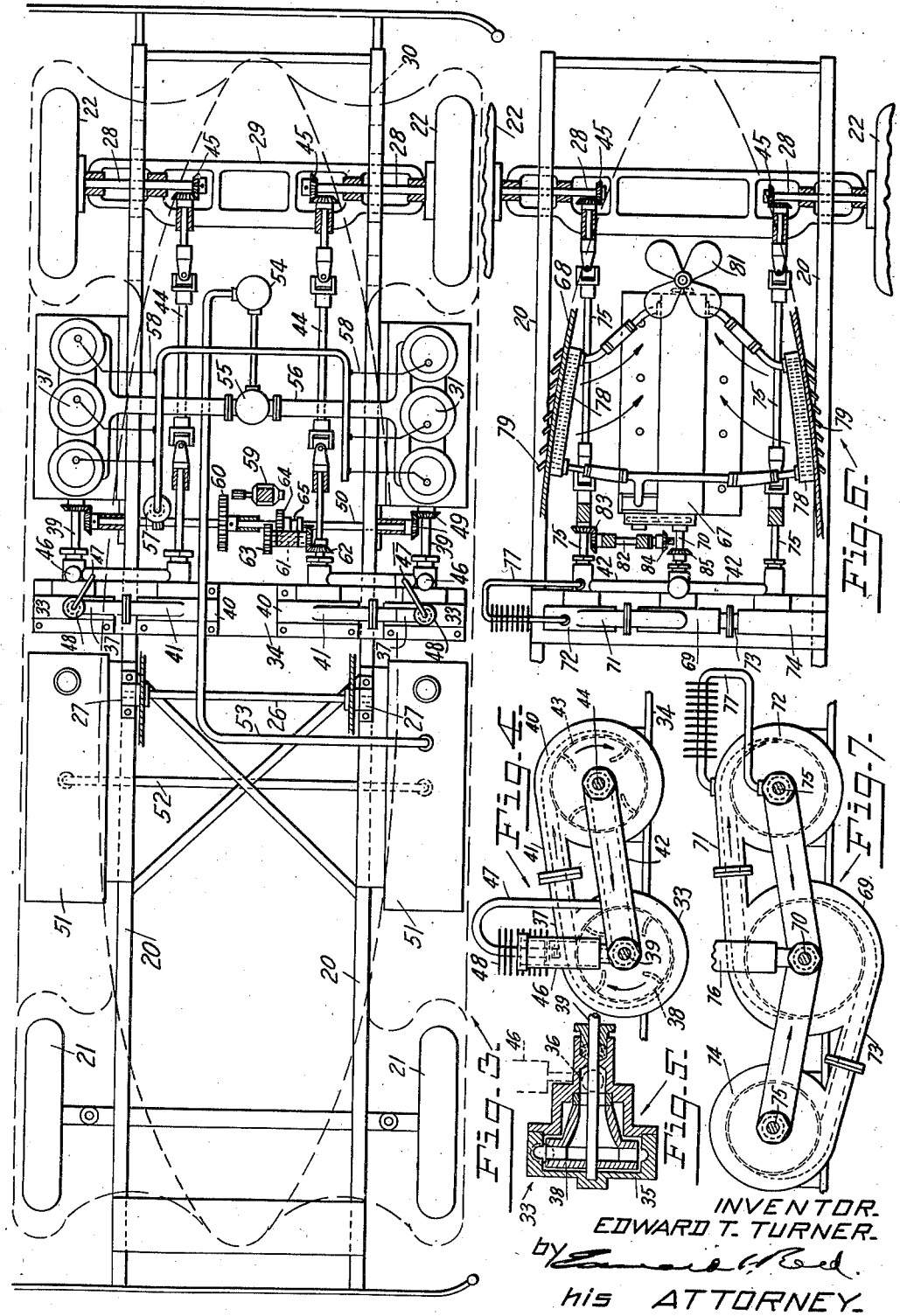

Patented Aug. 9, 1938

2,126,589

UNITED STATES PATENT OFFICE 2,126,589

AUTOMOBILE

Edward T. Turner, Dayton, Ohio

Application May 13, 1936, Serial No. 79,542

12 Claims. (Cl. 180—66)

This invention relates to automobiles and more particularly to the propelling mechanism therefor.

One object of the invention is to provide an automobile which will be of light weight, which will be inexpensive to manufacture and which may be operated at a low cost.

A further object of the invention is to provide an automobile propelling mechanism which will be very flexible as to torque and power at all speeds.

A further object of the invention is to provide an automobile propelling mechanism which will eliminate the necessity of shifting gears and to this end it is a further object to provide a hydraulic transmission mechanism for this purpose.

A further object of the invention is to provide an automobile of such a construction as to permit the use of a fully streamlined body.

A further object of the invention is to provide a four wheeled automobile which may be driven by the application of power to one wheel only.

Other objects of the invention may appear as the mechanism is described in detail.

In the accompanying drawings Fig. 1 is a side elevation of an automobile embodying my invention; Fig. 2 is a transverse sectional view taken on the line 2—2 of Fig. 1; Fig. 3 is a top plan view, partly in section, of the chassis with the body removed; Fig. 4 is an elevation of the hydraulic transmission mechanism; Fig. 5 is a sectional detail of a pump forming part of the hydraulic transmission mechanism; Fig. 6 is a plan view, partly in section, of a portion of a chassis of an automobile showing a modified form of propelling mechanism; Fig. 7 is an elevation of the hydraulic transmission shown in Fig. 6; Fig. 8 is a side elevation of the rear portion of the automobile of Fig. 6; Fig. 9 is a plan view of the chassis of an automobile, with the body removed, and partly in section, showing a further modification of the propelling mechanism; Fig. 10 is a side elevation of the rear portion of an automobile showing a modified arrangement of the engine; Fig. 11 is a plan view of the mechanism shown in Fig. 10; and Fig. 12 is a sectional detail view of the air duct taken on the line 12—12 of Fig. 10.

In that embodiment of the invention illustrated in Figs. 1 to 5 the automobile comprises a frame having parallel frame members 20 which are supported at their forward ends by steering wheels 21 and at their rear ends by driving wheels 22. Carried by the frame is an elongated body 23 which is fully streamlined and which may be mounted on the frame in any suitable manner but in the arrangement here shown it is mounted for pivotal movement about a transverse axis arranged adjacent to the center of gravity thereof and is provided at its rear end with an elevator plane 24 so arranged that when the automobile is moving at high speed the plane will depress the rear end of the body, thereby elevating the front end and will support the body for free floating movement about the transverse axis. In the present arrangement the passenger seats 25 are arranged in front of the pivotal axis. If they were arranged in the rear of that axis the elevator plane would be reversed to lift the rear end of the body. The present body is of the open type and its upper portion is of a width slightly greater than the width of the frame and overhangs the frame members, while the lower portion is of such width that it will extend downwardly between the frame members. A pivot shaft 26 extends through the body and is mounted at its ends in bearing brackets 27 carried by the frame members 20.

The rear driving wheels 22 are mounted for separate rotation and are here shown as carried by separate axles 28 which are journaled in a supplemental frame 29 which in turn is supported by springs 30 connected with the respective frame members. In the present arrangement semi-elliptical springs are employed and these springs are arranged beneath the axles and supplemental frame 29 to permit the frame to be arranged close to the road. The two driving wheels are driven from separate engines 31 which are here shown as air cooled engines and are mounted on the frame at the respective sides of, and exteriorly of, the body so that they will be exposed to the air currents created by the movement of the automobile, thus rendering other cooling mechanism unnecessary. In the present arrangement each engine is mounted on brackets 32 secured to and extending outwardly from the adjacent frame member.

Each engine has driving connection with the driving wheel on the adjacent side of the frame and this connection may be effected in any suitable manner but I prefer to employ hydraulic transmission mechanism which will eliminate the use of the transmission gearing and clutch. In the arrangement illustrated in Figs. 3 and 4 a separate transmission mechanism is interposed between each engine and the corresponding driving wheel and each of these transmission mechanisms comprises a rotary pump 33 mounted on a transverse frame 34 carried by the main frame. This pump may be of any suitable character but is preferably of the centrifugal volute type and as here shown corresponds substantially to the pump shown and described in the application for patent filed by me on April 26, 1934, Serial No. 722,446. This pump comprises a casing 35 having an axial inlet 36 and a peripheral outlet which is preferably tangential to the casing, as shown at 37. Mounted within this casing is a rotor 38 having central communication with the axial inlet of the casing and this rotor is secured to and driven by the shaft 39 of the corresponding engine. Mounted adjacent to the pump 33 is a fluid operated motor 40 having a peripheral inlet which is connected by a conduit 41 with the outlet of the pump and having an axial outlet which is connected by a conduit 42 with the axial inlet of the pump. Mounted within the casing of the motor 40 is a rotor 43 which is connected with a driving shaft 44 which in turn is connected with the axle 28 of the corresponding driving wheel 22, as by beveled gears 45. A supply reservoir 46 is connected with the circulation system of the transmission mechanism to replenish any loss of the propellant fluid and to permit of an expansion and contraction of the latter. In order to prevent the excessive heating of the propellant fluid a portion of that fluid may be subjected to the action of a cooling medium, which may be of any suitable character. In the arrangement shown I have provided a cooling device which comprises a tube 47 of small capacity connected at one end with the conduit 41 and at its other end with the conduit 42 and of such length that a substantial portion thereof will be exposed to the action of the cooling medium, in the present instance air. If desired, the tube may be provided with heat radiating fins 48. In operation a small portion of the fluid will be passed through this cooling tube and thereby cooled to such an extent that the body of fluid as a whole will be maintained at a proper temperature.

It will be understood that the transmission mechanisms for the two engines are of the same construction and will develop the same power and speed and to this end the two engines are so controlled that the pumps will be driven at the same speed. In the construction shown the engine shafts 39 are connected, as by beveled gears 49, with a transverse shaft 50 which will cause the two engine shafts to rotate in unison. The engines may be connected with any suitable source of fuel supply and, as here shown, two fuel tanks 51 are mounted on the respective sides of the main frame, exteriorly of the body, and are connected one to the other by a pipe 52. A fuel supply pipe 53 leads rearwardly from one tank to a vacuum tank 54 which is connected with a carburetor 55 which in turn is connected with the intake manifolds 56 of the two engines. A single timer 57, driven by the shaft 50, controls the ignition circuits 58 of the two motors. The two engines may be simultaneously started by means of an electric starter 59 of a well known construction which cooperates with the gear 60 on the shaft 50.

When the engines are operating at low speed, as when they are first started, the speed of the pumps will be such that the propellant fluid, which may conveniently be a suitable oil, will be discharged from each pump to its connected motor at a low velocity which will impart little or no movement to the rotor of the motor. As the speed of the engine picks up the velocity of the propellant fluid increases and imparts gradually increasing movement of the rotor of the motor, which movement is transmitted directly to the driving wheel and when the engines are operating at full speed the motors will have ample power to propel the automobile at the desired speed and under any ordinary load. The engines may be maintained at full speed under heavy load and at relatively low vehicle speed, as, for example, when the automobile is climbing a hill, and as the load on the motors retards the same the impelling force delivered thereto increases because the propellant fluid will act with more force upon a slow moving rotor than it will upon a faster moving rotor. Under ordinary driving conditions the speed of the vehicle is controlled by regulating the speed of the engines.

Any suitable reversing mechanism may be provided for causing the vehicle to be propelled in a rearward direction and, as shown in Fig. 3, this may be conveniently accomplished through a reversing shaft 61 connected by beveled gears 62 with one of the driving shafts 44, and having a spur gear 63 adapted to be engaged by a gear 64 which is splined to the shaft 50 and provided with a grooved hub 65 to receive the usual shifting yoke, which is not here shown. In this arrangement rearward movement is imparted to the vehicle by one driving wheel only. When the vehicle is operating in the reverse the engines will be driven at relatively low speed and the propellant fluid will be delivered to the motors at such low velocity as to have little or no propelling action thereon and thus these motors will not prevent or materially retard the reverse movement of the driving wheels.

It will be apparent that by the use of this propelling mechanism I have eliminated the transmission gearing, the clutch and the differential, thereby reducing both cost of production and the weight of the vehicle. Further, inasmuch as the engines are air cooled and no additional cooling mechanism is required these engines may be of light weight. Further, the ability to operate the engines at full speed under all load conditions provides ample power and a very flexible operation of the propelling mechanism.

If desired, the two driving wheels may be operated from a single engine, this engine being separately connected with the two wheels. In Figs. 6 and 7 I have shown such an arrangement where a single water cooled engine 67 is mounted within the body 68, a portion only of which is shown, and drives a pump 69, the rotor of which is connected with the engine shaft 70. This pump is similar to the pump 33 but may, if desired, be of larger capacity and is provided with two peripheral outlets arranged respectively at the upper and lower sides thereof. The upper outlet is connected by a conduit 71 with the inlet of a motor 72 and the lower outlet for the pump is connected by a conduit 73 with a motor 74. These motors are similar to the motors 40 and are connected by driving shafts 75 with the axles 28 of the driving wheels 22. A supply reservoir 76 and a cooling element 77 similar to those above described are provided. The operation of the hydraulic transmission is similar to that of the mechanism shown in Figs. 2 and 3 and it will be noted that the connections between the two motors and the pump are such that the motors will be driven in the same direction. The engine being mounted within the body, near the rear end thereof, I have provided special cooling means therefor consisting of radiators 78 mounted on or adjacent to the respective side walls of the body, the latter being provided with louvers 79 to direct the air through the radiators, which are connected with the water jacket of the engine in the usual manner. The body is provided to the rear of the engine with an air outlet 80 and, if desired, a motor driven fan 81 may be provided to increase the circulation of air through the radiators. In this arrangement also the vehicle is driven in a rear direction by reversing the drive for one wheel only and, as shown in Fig. 6, the reversing mechanism comprises a shaft 82 connected by beveled gears 83 with one of the driving shafts and having a second beveled gear 84 splined thereto for movement into and out of engagement with a beveled gear 85 secured to the engine shaft 70.

In Fig. 9 I have illustrated a very simple inexpensive and light weight automobile which can be operated at low cost. The frame 86 is supported at its forward end by the usual pair of steering wheels 87 and at its rear end by a second pair of wheels 88 and 89. Only the rear wheel 89 serves as a driving wheel, the rear wheel 88 and the front wheels 87 being mounted for free rotation. The wheel 89 may be driven from a very light air cooled engine through simple inexpensive connections. In the arrangement shown an air cooled engine 90 of the V-type, such as is commonly used on a motorcycle, is mounted on one side member of the frame 86, a bracket 91 being provided to support the same. The engine shaft is connected by beveled gears 92 with a longitudinal shaft 93 arranged within the frame and connected at its forward end with a pump 94 which delivers propellant fluid to a motor 95, the pump and motor being of the type above described and the motor being directly connected through a driving shaft 96 with the axle 97 of the driving wheel 89. Reversing mechanism 98, similar to that shown in Fig. 3, is provided for reversing the direction of rotation of the shaft 96. It will be obvious that the engine 90 may be connected with the driving wheel in any suitable manner but by the use of the hydraulic transmission the weight and cost of the mechanism is materially reduced and the automobile as a whole is of such light weight that an engine of relatively small capacity will provide the necessary power for its operation. In an inexpensive vehicle of this type I prefer that the body, shown in dotted lines at 99, should be rigidly secured to the frame.

In Figs. 10, 11 and 12, I have illustrated a propelling mechanism similar to that shown in Figs. 3 and 4 but which is adapted for the use of water cooled engines mounted on both sides of the frame and near the rear end thereof. In the arrangement shown I have mounted a water cooled engine 100 on the frame on each side of and exteriorly of a body 101. Arranged about each engine is a housing 102 which is closed on four sides so as to provide a longitudinal air duct within which the engine is arranged. Mounted at the forward end of the air duct is a radiator 103 which may be connected with the water jacket of the engine in the usual or any suitable manner and the housing is provided in the rear of the engine with one or more air outlets 104. Preferably a motor driven fan 105 is mounted at the rear end of the engine to increase the circulation of air through the radiator and about the engine. The engine may be connected with the driving wheels in the manner shown in Fig. 3 or in any suitable manner.

While I have shown and described my invention, together with certain embodiments thereof, I wish it to be understood that I do not desire to be limited to the details thereof as various modifications may occur to a person skilled in the art.

Having now fully described my invention, what I claim as new and desire to secure by Letters Patent, is:

1. In an automobile comprising a frame and driving wheels having supporting connection with one end of said frame and mounted for independent rotation, rotary fluid operated motors carried by said frame, means for separately connecting said motors with the respective driving wheels, rotary pumps having their outlets and inlets directly connected respectively with the inlets and outlets of the respective motors for delivering propellant fluid thereto at high velocity, and power operated means for actuating said pumps.

2. In an automobile comprising a frame and separately operable driving wheels having supporting connection with one end of said frame, two hydraulic propulsion units mounted on said frame at the respective sides thereof, each unit comprising a rotary motor and a rotary pump mounted side by side with their axes extending lengthwise of said frame, and conduits directly connecting the outlet of said pump with the inlet of said motor and the outlet of said motor with the inlet of said pump, means for driving said pumps, and means for separately connecting said motors with the respective driving wheels.

3. In an automobile comprising a frame and separately operable driving wheels having supporting connection with one end of said frame, two hydraulic propulsion units mounted on said frame at the respective sides thereof, each unit comprising a rotary motor and a rotary pump mounted side by side with their axes extending lengthwise of said frame, and conduits directly connecting the outlet of said motor with the inlet of said pump, two engines mounted on said frame and having driving connection with the respective pumps, and means for separately connecting said motors with the respective driving wheels.

4. In an automobile comprising a frame and wheels having supporting connection with said frame, propelling mechanism comprising a rotary fluid operated motor having a peripheral inlet and an axial outlet, a rotary pump having an axial inlet and a peripheral outlet, conduits directly connecting the outlet of said pump with the inlet of said motor and the outlet of said motor with the inlet of said pump, a reservoir connected with one of said conduits to receive excess fluid therefrom and to replenish the fluid therein, an engine for driving said pump, and means for connecting said motor with at least one of said driving wheels.

5. In an automobile comprising a frame and wheels having supporting connection with said frame, propelling mechanism comprising a rotary fluid operated motor having a peripheral inlet and an axial outlet, a rotary pump having an axial inlet and a peripheral outlet, conduits directly connecting the outlet of said motor with the inlet of said motor and the outlet of said motor with the inlet of said pump, a cooling device comprising a small capacity conduit connected with both the first mentioned conduits, an engine for driving said pump, and means for connecting said motor with at least one of said wheels.

6. In an automobile comprising a frame and a body carried by said frame, driving wheels having supporting connection with one end of said frame and mounted for independent rotation, rotary fluid operated motors carried by said frame, means for separately connecting said motors with the respective driving wheels, separate rotary pumps for delivering propellant fluid to the respective motors at high velocity, and separate engines mounted on the respective sides of said frame exteriorly of said body and operatively connected with the respective pumps, and means for causing said engines to operate in unison.

7. In an automobile comprising a frame, and a body carried by said frame, driving wheels having supporting connection with one end of said frame and mounted for independent rotation, fluid operated motors carried by said frame, means for connecting said motors with said respective driving wheels, power operated means for delivering propellant fluid to said motors, and reversing mechanism arranged to connect said power operated means with at least one of said driving wheels independently of said motors to move said automobile in a reverse direction.

8. In an automobile comprising a frame, an elongate body carried by said frame, a driving wheel having supporting connection with said frame, an engine mounted on the rear portion of said frame at one side of said body, a pump mounted in line with said engine and connected therewith, a rotary fluid operated motor connected with said pump to receive motive fluid therefrom, and means for operatively connecting said motor with said driving wheel.

9. In an automobile comprising a frame and driving wheels having supporting connection with one end of said frame and separately mounted for independent rotation, a water cooled engine mounted on said frame between the side walls of said body, said side walls having air inlet openings, radiators mounted adjacent to said openings and connected with said engine, a pump driven by said engine, fluid operated motors adjacent to said pump, connecting means for causing fluid to circulate directly from said pump to said motors and back to said pump, and separate means for connecting said motors with the respective driving wheels.

10. In an automobile comprising a frame and driving wheels having supporting connection with one end of said frame and separately mounted for independent rotation, separate engines mounted on said frame at the respective sides of said body, pumps connected with the respective engines, fluid operated motors connected with the respective pumps to receive motive fluid therefrom, means for separately connecting said motors with the respective driving wheels, and means for causing said engines to operate said pumps in unison.

11. In an automobile comprising a frame, a body carried by said frame and wheels supporting said body, an engine mounted on said frame at one side of and exteriorly of said body, means for establishing a driving connection between said engine and at least one of said wheels, a housing arranged about said engine to form a longitudinal air duct, and a radiator at the forward end of said duct and connected with said engine, said housing having an air outlet in the rear of said engine.

12. In an automobile comprising a frame and an elongate body carried thereby, separately rotatable driving wheels supporting the rear end of said frame, engines mounted on said frame on the respective sides of and exteriorly of the rear portions of said body, means for establishing driving connections between said engines and the respective driving wheels, housings arranged about the respective engines to form longitudinal air ducts, and a radiator mounted at the forward end of each duct and connected with the engine in said duct, each duct having an air outlet in the rear of its engine.

EDWARD T. TURNER.